United States Patent
Borst et al.

(10) Patent No.: US 8,369,271 B2
(45) Date of Patent: Feb. 5, 2013

(54) METHOD OF CONFIGURING A CELL OF A WIRELESS COMMUNICATION SYSTEM FOR IMPROVED RESOURCE UTILIZATION

(75) Inventors: Simon C. Borst, Convent Station, NJ (US); Michael J. Flanagan, Chester, NJ (US); Karl Georg Hampel, New York, NY (US)

(73) Assignee: Alcatel Lucent, Paris (FR)

( * ) Notice: Subject to any disclaimer, the term of this patent is extended or adjusted under 35 U.S.C. 154(b) by 1162 days.

(21) Appl. No.: 11/112,700

(22) Filed: Apr. 22, 2005

(65) Prior Publication Data

US 2006/0239224 A1      Oct. 26, 2006

(51) Int. Cl.
*H04W 4/00* (2009.01)

(52) U.S. Cl. ..... 370/329; 455/453; 455/449; 455/452.1; 370/332; 370/230; 370/230.1; 370/231; 370/232; 370/249; 370/252

(58) Field of Classification Search .......... 370/329, 370/332, 230, 230.1, 232, 237, 249, 252; 455/449, 452.1, 453

See application file for complete search history.

(56) References Cited

U.S. PATENT DOCUMENTS

| | | | | |
|---|---|---|---|---|
| 5,715,526 A | * | 2/1998 | Weaver et al. | 455/126 |
| 6,052,408 A | * | 4/2000 | Trompower et al. | 375/141 |
| 6,223,041 B1 | * | 4/2001 | Egner et al. | 455/452.2 |
| 6,487,415 B1 | | 11/2002 | Eibling et al. | 455/453 |
| 6,496,531 B1 | | 12/2002 | Kamel et al. | 375/130 |
| 6,609,007 B1 | | 8/2003 | Eibling et al. | 455/522 |
| 6,760,597 B2 | | 7/2004 | Salvarani | 455/522 |

OTHER PUBLICATIONS

Kohji Takeo et al., "Evaluation of a CDMA Cell Design Algorithm Considering Non-uniformity of Traffic and base Station Locations", IEICE Trans. Fundamentals, vol. E81-A, No. 7, Jul. 1998, pp. 1367-1377.
Lin Du et al., "Towards Intelligent Geographic Load Balancing for Mobile Cellular Networks", IEEE Trans. On Systems, Man, and Cybernetics-Part C: Applciations and Reviews, vol. 33, No. 4, Nov. 2003, pp. 480-491.
Lester T. W. Ho et al., "Applying Emergent Self-Organizing Behavior for the Coordination of 4G Networks Using Complexity Metrics", Bell Labs Technical Journal 8(1), 5-25 (2003) © 2003 Lucent Technologies Inc., Published by Wiley Periodicals, Inc., Published online in Wiley InterScience (www.interscience.wiley.com), pp. 5-25.

* cited by examiner

*Primary Examiner* — Wayne Cai
*Assistant Examiner* — Chuck Huynh
(74) *Attorney, Agent, or Firm* — Wolff & Samson, PC

(57) ABSTRACT

At least one base station of a wireless network adjusts its access area so as to drive at least one measure of utilization of a resource or resources of that cell toward, but not to exceed, a specified maximum level. The adjustment is dynamic in that it responds in real time to traffic fluctuations. The adjustment is autonomous in that it is not directed from outside the cell. The access area of the cell is determined by the received strength, at the respective users, of a beacon channel transmitted from the base station. In specific implementations, the access area may be adjusted by adjusting the effective signal transmit strength of the beacon signal, or by adjusting the tilt of the antenna that transmits to the cell.

17 Claims, 2 Drawing Sheets

METHOD OF CONFIGURING A CELL OF A WIRELESS COMMUNICATION SYSTEM FOR IMPROVED RESOURCE UTILIZATION

FIELD OF THE INVENTION

The invention relates to the configuring of cells in wireless communication systems. More particularly, the invention relates to methods aimed at optimizing the performance of cellular networks through adjustment of cell-access areas.

ART BACKGROUND

In a typical cellular network, a plurality of base stations are distributed over a target coverage area. A backhaul network connects the base stations to a central node which may, for example, include a radio network controller (RNC) or base station controller (BSC). Wireless users, for example mobile users, communicate with the base stations through the wireless air interface.

Each base station applies certain resources to the processing and transmission of communication traffic. These resources may include access channels, channel codes, spreading codes, packet pipes, time slots, and forward link power, among other things. Such resources are referred to here as "cell resources."

It will be appreciated that such cell resources are finite. As a consequence, such resources may be fully committed at high load levels. The possibility that one or more cell resources may be fully committed can limit the maximum traffic load that a base station can handle.

The demand for cell resources varies both geographically and as a function of time. In mobile networks, for example, the mobile users will not, in general, be uniformly distributed over the target coverage area. Instead, some cells will tend to be more heavily populated than others at a given time. At different times, the relatively high concentrations of users might shift to different cells. User mobility also leads to fading effects which cause resource demand to fluctuate over time.

Even without user mobility, resource demand might have geographical and temporal variations. For example, because radio propagation is affected by distance, terrain, and clutter, the demand for certain cell resources depends on the specific locations of the users within the cell. Moreover, even in a fixed network, resource demand may fluctuate over time due to fading effects and temporal variations in call duration or session duration, and in arrival rate.

Because fluctuation in resource demand has many possible causes, it may occur over many timescales. For example, fading may occur on scales of milliseconds to seconds; the statistical behavior of calls and data sessions may create fluctuations on the order of minutes; and in mobile networks, the number of mobile users in a given cell may change with hourly, daily, or seasonal traffic patterns.

To accommodate such fluctuations, wireless networks are typically designed for peak, rather than for average, traffic demand. As a consequence, there will typically be widespread underutilization of available cell resources. Because cell resources are expensive, such underutilization is undesirable.

Several approaches have been tried for increasing the efficiency with which cell resources are utilized. For example, network planning tools are available for taking advantage of propagation models and traffic projections when planning a new or updated network. Some of these tools include algorithms for tuning some of the parameters that define the cell configuration so as to maximize a measure of network performance. Although useful, such planning tools are limited by the accuracy of their models, and by the fact that it takes weeks or more to implement their prescriptions in an actual network.

In other approaches that have been proposed, link measurements or cell measurements are evaluated by a central processor, which determines local settings at individual base stations which will collectively lead to better coverage, capacity, or some other network performance metric. In such an approach, which is a type of dynamic network self-configuration, the adjustments at the individual base stations might affect, for example, antenna tilt, cell power levels, or power levels of selected downlink channels. Although potentially useful, such approaches suffer the disadvantage that they are complex, slow, and expensive to implement. See, e.g., K. Takeo and S. Sato, "Evaluation of a CDMA cell design algorithm considering non-uniformity of traffic and base station locations," *IEICE Trans. Fundamentals*, Vol. E81-A, No. 7, 1998, pg. 1367-1377, and L. Du, J. Bigham, and L. Cuthbert, "Towards intelligent geographic load balancing for mobile cellular networks," *IEEE Transactions on Systems, Man and Cybernetics*, C33, No4, 2003, pg. 480-491.

In yet other proposals, various base stations behave as cellular automata. The network configures itself through the collective behavior of the cellular automata, each of which adjusts its access area according to the transmit power of a particular beacon channel. Unlike the type of dynamic network self-configuration described above, the method based on cellular automata does not need a centralized processor. However, it suffers from undesirable complexity because of the need for the automata to intercommunicate through the backhaul, and the need for sequential self-sampling by the cells to optimize the power settings. Sequential self-sampling is slow and subject to the formation of system-wide instabilities. See, e.g., L. T. W. Ho, L. G. Samuel, and J. M. Pitts, "Applying emergent self-organizing behavior for the coordination of 4G networks using complexity metrics", *Bell Labs Technical Journal*, 8 (1), 2003, pg. 5-25.

Thus, there remains a need for new approaches to network configuration, that can lead to more efficient resource utilization.

SUMMARY OF THE INVENTION

In accordance with the present invention, at least one base station of a wireless network adjusts its access area so as to drive at least one measure of utilization of a resource or resources of that cell toward, but not to exceed, a specified maximum level. The adjustment is dynamic in that it responds in real time to traffic fluctuations. The adjustment is autonomous in that it is not, or need not be, directed from outside the cell. In principle, the dynamic adjustment could in fact be made in response to signals from a control element physically located outside the cell, for example at a higher-level node of the network. However, we still consider the adjustment to be autonomous if intracell measurements are sufficient to direct the dynamic adjustment.

The access area of the cell is determined by the received strength, at the respective users, of a beacon channel transmitted from the base station.

In specific implementations, the access area may be adjusted by adjusting the effective signal transmit strength of the beacon signal.

In alternative implementations, the access area may be adjusted by adjusting the tilt of the antenna that transmits to the cell. In general, antenna tilt may be adjusted mechanically using, e.g., a motor, or it may be adjusted electronically by controlling a phase-shifter array.

In certain networks, at least some cells may be sectorized cells. In such cases, we will use the term "cell" to include individual sectors of sectorized cells. According to an implementation that may be useful in such networks, the access area may be adjusted by adjusting the tilt of the antenna that transmits to a particular sector.

DETAILED DESCRIPTION

Figure 1:
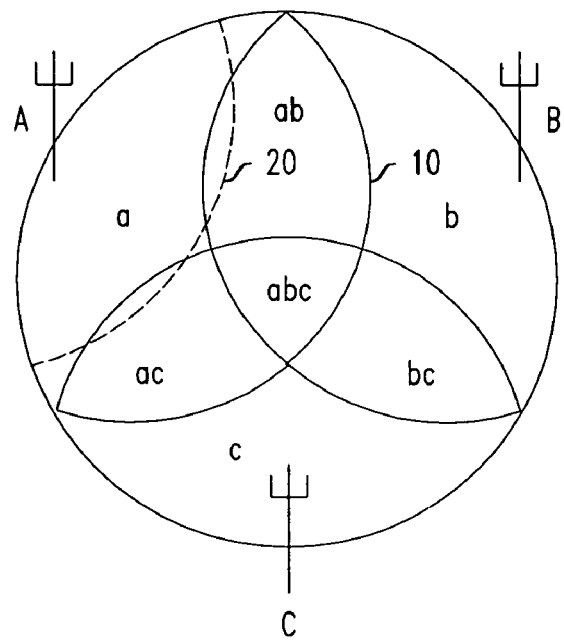
FIG. 1 is a schematic drawing illustrating the access areas of three mutually neighboring cells.

The principles of the present invention will find application in those wireless networks in which a downlink beacon channel and/or an antenna having adjustable beam directionality can be used to adjust the cell coverage area, and in which, further, there is provision for dynamically handing off users from one cell to another. Generally, Third Generation (3G) wireless technologies, among others, will provide such conditions. In 3G technologies, the beacon channel is called the "pilot channel" or "PICH" and the cells are typically implemented as sectorized cells using directional antenna beams.

For illustrative purposes, but without limitation, the following description will be directed mainly toward implementations in 3G wireless networks.

In 3G systems, the access area of each cell is determined by the received signal strength of the beacon channel. The cell-access area can therefore be adjusted by either changing the effective transmit signal strength of the beacon signal or by altering the antenna tilt of the corresponding cell sector, or both. As noted above, the term "cell" in our terminology includes an individual sector of a sectorized cell.

As noted above, any of various cell resources might approach an insuperable limit at high levels of traffic load. In our method that is to be described, we provide a metric $R(t)$, which represents, at each moment $t$ of time at a given cell $k$, the degree to which a specified resource or combination of resources is being utilized. The resource or combination of resources on which the metric is based will be referred to here as the "identified resource."

We also provide an upper bound Rmax which represents the maximum amount of the identified resources that is available at cell $k$. By way of example, $R(t)$ could in specific implementations be the number of trunks used at time $t$ (depending on the specific signal format, a "trunk" could be equivalent, e.g., to a channel code or a packet pipe), and Rmax could in such a case be the maximum number of available trunks. Alternatively, $R(t)$ could measure the current power amplifier (PA) load level, and Rmax the maximum power the PA is rated for.

Generally, $R(t)$ and Rmax will relate to that resource which is first to approach its upper limit as traffic load is increased. Often, one particular resource will be readily identifiable as that which first encounters a limit. If that is not the case, and instead multiple resources must be considered, $R(t)$ and Rmax can be derived from metrics associated with the critical resources.

It should be noted in this regard that in the event that demand for $R(t)$ should exceed Rmax, a typical network will invoke, at the cell or at a higher node such as the RNC, an overload protection mechanism such as call blocking or power rescaling. Additionally or alternatively, data transmission might be delayed. Power rescaling is described, for example, in U.S. Pat. No. 6,609,007, commonly assigned herewith and incorporated by reference herein in entirety.

In an exemplary embodiment of our method, a target resource level Rtg is selected. Rtg must be less than Rmax. The specific value of Rtg depends on the timescale over which the resulting adjustments are to occur, and on the speed and amplitude of the fluctuations of $R(t)$. A useful guiding principle for setting Rtg is that the cell access area should grow (and thus include more users) to keep $R(t)$ as close to Rmax as possible while also avoiding overswings of resource demand beyond Rmax that are so frequent and so severe as to be statistically intolerable. That is, it will be advantageous in at least some cases to set Rtg relatively high for greatest efficiency, even though occasional overswings will have to be tolerated as a result.

It should be noted that Rtg may be dynamically adjusted as a time-varying quantity $Rtg(t)$. Moreover, the overload protection mechanisms mentioned above can be considered in setting the value of $Rtg(t)$. That is, the measurements of the overload protection mechanisms can be used to dynamically adjust $Rtg(t)$ to the maximum level that is compliant with overload statistics.

Broadly speaking, our method in exemplary embodiments operates at a given cell $k$ according to the following two conditional steps:

1. When $R(t)<Rtg<Rmax$, the access area of cell $k$ is expanded by increasing the beacon power or by reducing antenna tilt. As a result, more users will be handed over from neighbor cells to cell $k$, thereby causing $R(t)$ of cell $k$ to increase. This handover is carried out, e.g., through known procedures. Such procedures include cell selection as specified in pertinent wireless standards documents, and changing the soft handoff state of the cell boundary users, likewise specified in standards documents. When the target value is reached, i.e., when $R(t)=Rtg$, cell expansion is halted.

2. When resource demand exceeds Rtg, i.e., when $R(t)>Rtg$, the cell access area is reduced until Rtg is reached again.

With reference to FIG. 1, for example, the expanded access area of cell A includes regions a, ab, ac, and abc. Analogous statements apply to the access areas of cells B and C. It will be appreciated that regions ab, ac, bc, and abc are cell overlap regions in which each user will typically select that cell having the strongest signal. Thus, if for example the access area of cell A should be reduced from boundary 10 to boundary 20, those users left behind in regions ab, ac, and abc could be handed over to cell B or cell C, as appropriate. The converse would apply if the access area of cell A were to expand from boundary 20 to boundary 10.

In at least some cases, it will be desirable to impose certain limits on the range of the adjustable cell parameters. Thus, if for example the antenna tilt is an adjustable parameter, it may be desirable to set a minimum value for the antenna tilt. In at least some cases, an appropriate value for the minimum tilt will be that angle at which the main beam of the antenna points to the default cell radius.

In at least some cases it will likewise be desirable to set a maximum value for the beacon power. One obvious limit on the beacon power is of course the maximum total available downlink power.

A detailed examination of the downlink power budget may lead to even more restrictive limits on the beacon power. For example, other channels must be able to communicate over the range set by the beacon power. Moreover, the power of common channels (e.g., paging and synchronization channels) is generally required to match the beacon power.

In power-controlled systems, the maximum power bound for dedicated channels is also generally scaled to the beacon power. (The dedicated channel power bound can be scaled to the beacon power to assure the same coverage area for both the beacon and the dedicated channel.) Thus, it will generally be desirable to adjust the overall downlink gain factor in such systems for all channels in unison. For the dedicated channels, however, the operation of power control will automatically counteract downlink gain adjustments on a very fast time scale (on the order of milliseconds) unless they have reached a bound.

For systems with data-rate control (e.g., EV-DO and HSDPA), which utilize all (remaining) power, only the common channels will generally need to be adjusted.

The practitioner may apply any of various policies or combinations of policies in imposing a lower limit to the cell access area. One possible policy, for example, is to always keep a sufficient overlap between neighboring cells so that the probability of dropping a user as it moves from one cell to another is not unacceptably high. Under such a policy, the minimum cell radius is advantageously set relatively high, and resource overload is advantageously limited by some other means, such as through access blocking.

Under the same policy, an alternative response to resource overload is to progressively shrink the overloaded cell through the method described above, and thereby to progressively reduce access to the cell by wireless users. This would be particularly efficient in a power-controlled system in which downlink power is a limiting resource. The reason is that the first users to be shed off will be those with the highest power demand.

Moreover, such an approach has the further advantage that users that have been shed off by one cell may still be supported by neighbor cells if those neighbor cells can compensate the potentially higher link propagation loss through larger beacon power or higher effective antenna gain (due to smaller tilt). One possible consequence is the dynamic load balancing of cells without the need for intercell communications, coordination, centralized data acquisition or processing. Such a result would minimize the degradation of network performance from load spikes, and hence would enhance the effective network capacity.

Of course it should be noted in this regard that antenna tilt and beacon power may be adjusted in combination to adjust the cell coverage area.

The method described above can be carried out on any of various timescales. The particular timescale that is most effective will depend on the particular circumstances.

One factor to be considered in determining the timescale is the speed at which the affected parameters can be adjusted. For example, downlink power can be adjusted on a timescale of milliseconds, but antenna adjustments, particularly mechanical tilt adjustments, may be much slower.

Interaction with other network control processes may also need to be considered. For example, if cells are adjusted too quickly, one result may be a relatively large volume of collective handovers, which may unduly burden the ability of the network to perform handover messaging and call processing.

Additionally, it is advantageous for our method to be carried out in a manner that is consistent with existing mechanisms of load balancing. For example, there are cell-level schedulers that provide some load balancing on a timescale, typically of a few seconds, determined by latency tolerance. In order to be consistent with such mechanisms, our cell adjustments should be carried out on a slower timescale.

In a network that implements our method, lightly loaded cells will automatically expand and in doing so will take over load from heavily loaded neighbor cells. On the other hand, cells that become overloaded will automatically shrink and hence will ipso facto shed off load to their neighbor cells. Although such behavior may be performed autonomously by individual cells, it will generally tend to make the overall system more balanced, i.e., to distribute traffic more evenly over cells. As a consequence, the effective network capacity will increase. This is true for power controlled systems with dedicated channels as well as for data-rate-controlled systems with shared channels.

One consequence for propagation-dependent resources in, e.g., power-controlled systems, is that lightly loaded cells can use non-utilized resources to provide better coverage for users with poor propagation conditions, such as users in buildings.

Another consequence is that in data-rate-controlled systems, the common channels (for example, the pilot channel and control channels) can be received with better signal strength. The lower data rate under such conditions can be compensated by assigning more time slots.

As noted, our method is "autonomous" in the sense that the adjustments of cell parameters are not dictated from outside the individual cell. Moreover, it should be noted that specific implementations can be carried out within a given cell without inter-cell messaging, inter-cell coordination, centralized processing, or centralized data acquisition. At least under such a circumstance, implementation can be inexpensive and readily achieved. In addition, it will in at least some cases be possible to automate the autonomously prescribed adjustments, and thus to eliminate costs otherwise attributable to manual operation and maintenance.

Our method can be implemented as an adjunct to existing mechanisms of overload control, and as noted, can beneficially use load metrics acquired by the existing overload controls.

Our method is general in application and not limited to any specific resource that might become critical when the traffic load is high, or to any particular congestion control algorithm that is implemented alongside it, or to any particular metric for characterizing the overload state.

Below, we will describe several specific implementations of our method.

Initially, it should be noted that in power-controlled systems with dedicated channels, such as 3G1x and UMTS, the downlink power can be adjusted by changing the downlink gain factor after the signals of the relevant channels have been combined. The adjustment can be done either on the digital or the analog level, at base band or after modulation onto the carrier.

For HSDPA, all channels but the high-speed downlink packet access channel should be power adjusted.

EV-DO Rev. 0 and Rev. A currently lack a mechanism to adjust the power levels of individual channels. This can be accomplished, instead, through standard upgrades that allow changing the magnitude of the pilot and control sections in each time slot, or to dynamically allocate a longer time fraction per slot to these tasks.

Implementations addressed to adjusting the antenna tilt are applicable to all current wireless standards that permit handover.

R(t) can be based on any load metric or combination of metrics that is repeatedly measured by the cell, preferably at fixed intervals of one measurement period. R(t) can also be based on any metric used by the cell to characterize the cell's overload state. In general terms, let R(t) measure the utilization of the identified resource as a function of time, and let B(t) be a time-dependent metric that characterizes the overload state of that resource. As mentioned above, R(t) can be the PA power level, the number of codes, channel elements, packet pipes or some other parameter or combination of parameters. Per measurement period, B(t) can represent, e.g., the fraction of time spent in overload, the integral amount by which R(t) has exceeded Rmax, or any measure of degradation of the service experienced by users, such as the actual access blocking rate due to overload or other measures of discontinuity of network access, or measures of reduced quality of service. We adopt a further variable Bmax, whose value is selected to represent the maximum tolerable level of <B(t)>, i.e., of the long-term expectation value of B(t). That is, Bmax is set to a level such that it would be undesirable for <B(t)> to exceed Bmax in normal operation.

Bmax is preferably set such that operating the network at a level of <B(t)>=Bmax at all times would be acceptable. For example, suppose B(t) represents the access blocking rate. It is typical to specify cell capacity in terms of peak traffic which causes access blocking at a rate of 1%-2%. However, such a value is inappropriate in this context because it applies only to exceptional peak load conditions. Instead, Bmax should be given a significantly lower value. For example, a value of Bmax=0.1% might be appropriate, since such a blocking rate would hardly change the overall performance perceived by mobile users subject to calls dropped at a rate of a few percent.

Example 1

Downlink power, but not antenna tilt, is adjusted. We assume that the downlink gain can be made to follow fluctuations in R(t) as rapidly as necessary, and that B(t) can be estimated from R(t) in predictive fashion. This makes it possible to set Rtg to a fixed value, as will be seen below.

Suppose that R(t) measures the number of trunk-equivalent properties utilized by the cell, such as channel elements, frequencies, or packet pipes. Then the probability for B(t), representing the rate at which access is blocked, can be derived from R(t) through a stochastic model, b:

$Pr(B(t))=b(R(t))$.

Rtg can be derived from the inverse function of b through:

$Rtg=b^{-1}(Bmax)$.

As a result, the long term average of the access blocking rate B(t) will remain at or below Bmax if the downlink gain controller succeeds in maintaining R(t) at or below Rtg. An algorithm for that purpose can be implemented in the following fashion:

If $(R(t)<Rtg)$ G(t)=G(t-1)+dG(t)
Otherwise G(t)=G(t-1)-dG(t).

G is the downlink gain factor, dG is the control step exercised at each time step of the control-loop operation, t assigns the current time step, and t-1 assigns the prior time step. The time-step size and dG have to be chosen such that the overall response is able to shed off the outmost boundary user faster than an additional user can enter the system. Although there are scenarios in which this implementation may be useful, there will be others in which some level of performance is sacrificed.

Example 2

Downlink power, but not antenna tilt, is adjusted.

We drop the assumption that the response time of the gain control is short enough to allow for effectively instantaneous responses to changes in R(t). Moreover, we allow for the possibility that the amplitude of fluctuations in R(t) may change in an unpredictable fashion over time. We here describe a gain control algorithm, to be used under such less idealized conditions, for maintaining the long-term expectation value<B(t)> at or below Bmax. Rtg is now a function Rtg(t) of time.

The algorithm has two embedded loops: an inner loop and an outer loop. The inner loop adjusts the downlink gain to follow the time-dependent target value Rtg(t). This inner loop can be implemented as a proportional/integral control.

Figure 2:
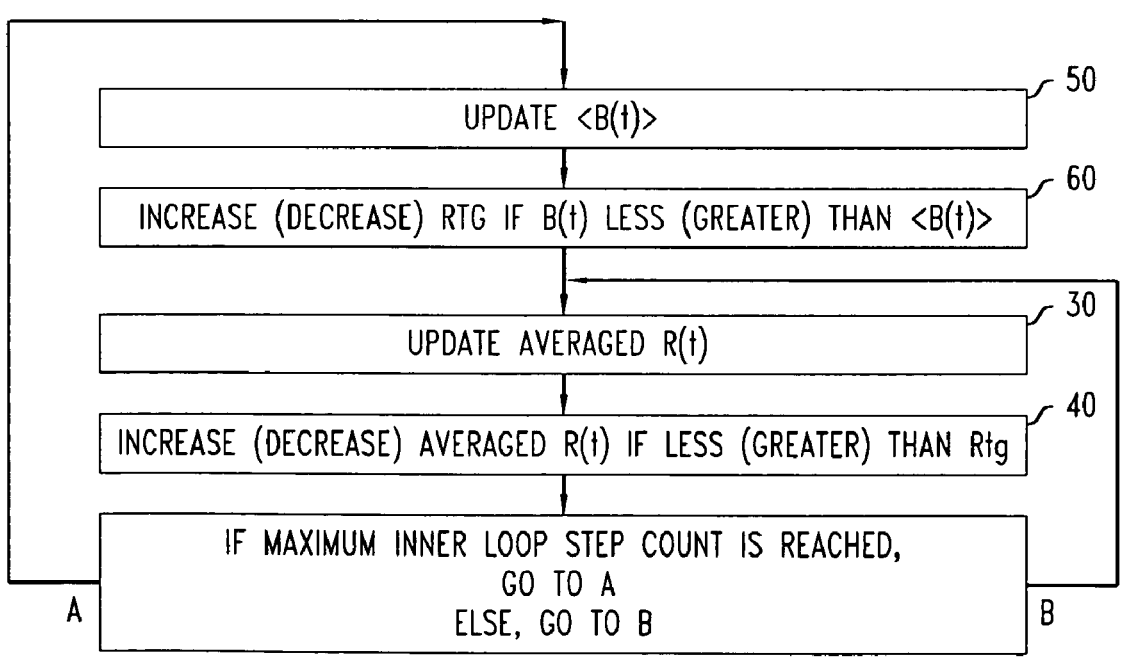
FIG. 2 is a high-level flowchart illustrating the operation of a control algorithm according to the invention in an illustrative embodiment.

As shown in FIG. 2, R(t) is averaged at block 30 with some time constant, and adjusted toward Rtg(t) at block 40.

The outer loop measures B(t) and sets the target Rtg(t) so that the expectation value of B(t) stays at or below Bmax. The outer loop can be implemented either as a proportional/integral control or as a sawtooth algorithm. The former solution maintains <B(t)> exactly at Bmax, but it responds slowly to temporary overload conditions. The latter solution responds quickly to overload conditions. This leads to expectation values of B(t) below Bmax and, as a consequence, leads to a somewhat reduced magnitude for Rtg(t).

As shown in FIG. 2, the value of <B(t)> is updated at block 50, and Rtg(t) is adjusted toward <B(t)> at block 60.

This double loop algorithm can be used for any set of metrics for R(t) and B(t).

Inner Loop $Ravg(t)=(1/T1)*(Rtg(t)-R(t))+(1-(1/T1))*Ravg(t-1)$ $P1(t)=alfa1*Ravg(t)$ $I1(t)=(1/T1)*Ravg(t)+I1(t-1)$ $G(t)=P1(t)+I1(t)$ Where:
Ravg(t): Time-averaged deviation between R(t) and Rtg(t).
Ravg(t-1): Time-averaged deviation between R(t) and Rtg(t) in the prior time step.
T1: Averaging time and integral time constant.
G(t): Downlink gain at time step t,
G(t-1): Downlink gain in the prior time,
alfa1: Proportionality constant
P1(t): Proportionality factor.
I1(t): Integral factor.

The ratio of T1/alfa sets the response time of the control mechanisms. T1 further sets the damping of the control loop system.

Outer Loop with Proportional/Integral Control $Bavg(t)=(1/T2)*(Bmax-B(t))+(1-(1/T2))*Bavg(t-1)$ $P2(t)=alfa2*Bavg(t)$ $I2(t)=(1/T2)*Bavg(t)+I2(t-1)$ $Rtg(t)=P2(t)+I2(t)$ Where:
Bavg(t): Time-averaged deviation between Bmax(t) and B(t).
Bavg(t−1): Time-averaged deviation between Bmax(t) and B(t) in the prior time step.
T2: Averaging time and integral time constant.
Rtg(t): Target level for inner loop of R(t),
Rtg(t−1): Target level for inner loop at prior time step,
alfa2: Proportionality constant
P2(t): Proportionality factor.
I2(t): Integral factor.
To keep the outer loop stable, T2 is advantageously set to: T2≧T1/Bmax.

| Outer Loop with Sawtooth Control |
| --- |
| //comment: Sum B(t) over time T2 in steps of dT<br>Bsum(t) =0<br>For(t = 0 to T2) Bsum = Bsum + B(t);<br>Bsum = Bsum * dT/T2;<br>//comment: If B(t)>Bmax step up, else step down<br>If(Bsum > Bmax) Rset = Rset − dRdwn<br>Otherwise Rset = Rset + dRup<br>//comment: smooth steps over time<br>Rtg(t) = (1/T1) * Rset(t) + (1− (1/T1)) * Rset(t−1) |

Where:
Bsum(t): Sum of B(t) events during integration time T2.
Rset(t): Set value for inner loop.
dRdwn: Down-step for set value.
dRup: Up-step for set value.
T2: Summing time for outer loop.
dT: Time per time step of outer loop.
T1: Averaging time from inner loop.
Rtg(t): Target level for inner loop of R(t),
Rtg(t−1): Target level for inner loop at prior time step,
The following conditions should be met:

$$dRup = dRdown * Bmax,$$

$$dT << T1,$$

$$T2 > T1 \text{ (it only needs to be slightly larger than T1)}.$$

Example 3

This is a specific implementation of Example 2, in which R(t) represents the downlink PA power. The quantity R(t) can already be a time-averaged quantity with averaging time $T_0$. This averaging time could, for instance, be set slightly below the inner-loop power control response time (0.667 msec for UMTS, 1.25 ms for 3G1x). In that case, power fluctuations caused by power control would still be captured, whereas faster fluctuations, due, e.g., to baseband code combining, would have been filtered out.

Rmax represents the upper bound the PA has been rated for with respect to fluctuations over time scales of $T_0$. B(t) can measure an excess of R(t) over Rmax (referred to here as "overswing") and Bmax can represent the margin within which B(t) is to be maintained over the long term. (Thus, R(t), Rtg(t), and Rmax may all be defined with respect to at least one property of an aggregate downlink transmit power level, which in this example may be a time-averaged power level.)

In such a case, the proportionality factor alfa1 is chosen to lie at or near unity. The time scale factor T1 is set to lie in the range of 1-10 seconds, and preferably in the range of a few seconds. Such a timescale can be regarded as a compromise between the objective of responding as fast as possible to load fluctuations, and the objective of avoiding conflict with existing dynamic control mechanisms such as inner- and outer-loop power control.

If T1 were reduced to values substantially smaller than one second, other adverse effects might result. These might include, for example, collective handoff events that propagate from one cell to the next due to fast changes of beacon power.

On the other hand, a further advantage of setting T1 in the range of a few seconds is that in such a case, T1 will lie above typical delay times considered acceptable for most data services. Scheduling can therefore take full advantage of channel and load variations on timescales shorter than T1 (e.g., in UMTS with HSDPA).

It should be noted that sudden power spikes may occur on timescales below T1 due, e.g., to power control of dedicated channels. For protection against such power spikes, a power rescaling can be used on a rapid time scale (generally, of a few milliseconds). Such rescaling is described, e.g., in U.S. Pat. No. 6,609,007, cited above. In an alternative approach, power-up commands by power control can be dismissed. Either approach will protect the PA from short-term overswings.

Since both approaches can degrade call performance, they should be bounded. This is achieved by the above-described control system if Bmax is set sufficiently low, for example around 1%. The threshold Rmax for the outer loop can be set to the value where the additional fast PA protection systems are triggered.

The algorithm described here can be combined with an access blocking control triggered by power overload. In such a case, Rmax can be set close to the PA level at which access blocking is invoked.

We performed a dynamic simulation based on Example 3 with a granularity of 500 ms. We modeled a simple network consisting of four cells, each at a respective corner of a square area in which mobile users can move freely. Calls were assumed to arrive according to a Poisson process, have exponential holding time, and use one power-controlled dedicated channel. Certain results of our simulation are displayed in FIGS. 3 and 4.

Figure 3:
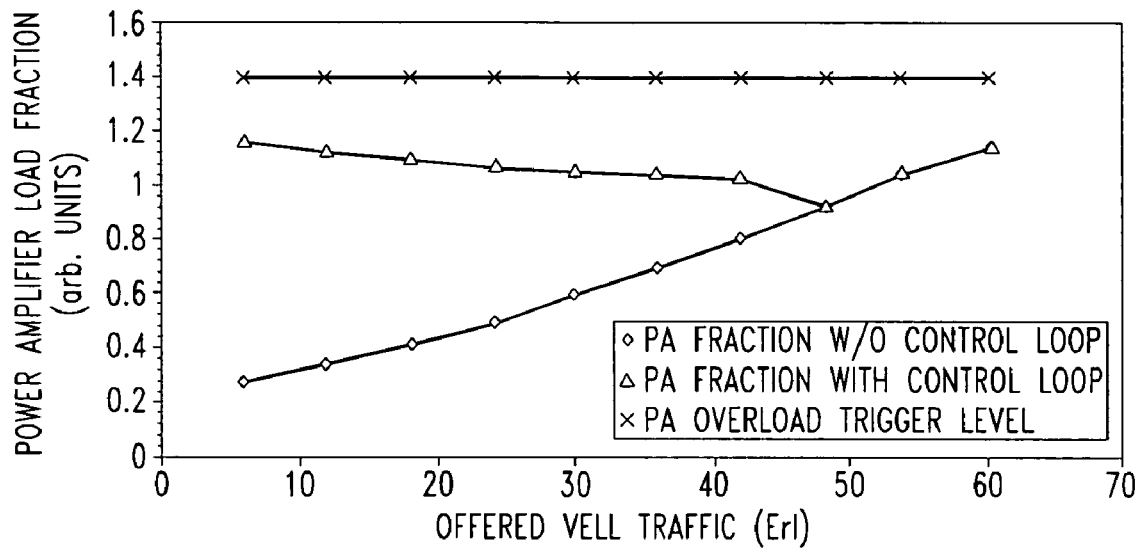
FIG. 3 is a graph showing the results of a numerical simulation. In the graph, we plotted average power from the power amplifier versus offered network traffic load. Comparative results are shown for a conventional network and for a network that utilizes a specific, exemplary embodiment of the invention.

FIG. 3 shows the average PA power versus the offered network traffic load for a conventional network (lower curve) and for a network that utilizes an implementation of the invention according to Example 3, employing a sawtooth algorithm in the outer loop (middle curve). The upper curve of the figure indicates the overload trigger level for the PA.

Figure 4:
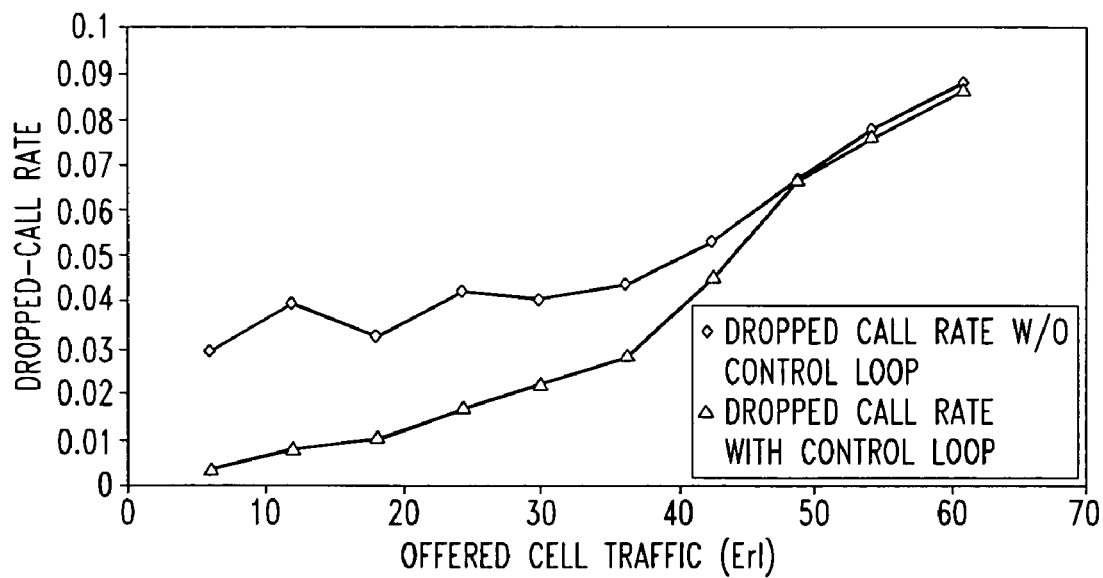
FIG. 4 is a graph showing further results of the simulation of FIG. 3. In the graph of FIG. 4, we plotted dropped call rate versus traffic load for the conventional network and for the inventive network.

FIG. 4 shows the dropped call rate versus traffic load for the conventional network (upper curve) and for a network according to the invention (lower curve) as modeled in our simulation. It will be apparent from the figure that the methods described here can in at least some cases substantially reduce the dropped call rate at light and medium load levels.

Example 4

Antenna tilt, but not downlink power, is adjusted.

Essentially the same procedures are applied as in Example 1 or Example 2. Since the effective downlink gain G(t) measured at the cell boundary changes in a very nonlinear fashion with the antenna tilt, the antenna tilt adjustments should capture this phenomenon. This means that the same algorithms can be used as above, but the antenna tilt angle γ must be computed from G(t) via a nonlinear function γG(t)), which is derived from the vertical antenna pattern and the antenna down angle to the approximate distance of the cell boundary.

Since the antenna may have electromechanical adjustment mechanisms, the response may be much slower than that for the downlink gain adjustment. However, antenna tilt adjustment has the advantage that it shapes the vertical propagation profile in addition to mere power adjustment.

Example 5

Both antenna tilt and downlink power are adjusted.

Adjusting both the antenna tilt and the gain offer the combined benefits of vertical beam shaping through the tilt adjustments, and fast response through the downlink gain adjustments. There are various ways to combine the two types of adjustment.

If the tilt adjustments are slower than the downlink gain adjustments, two respective control mechanisms can be used, having different time constants, proportionality factor, and adjustment bounds.

If the tilt adjustments are as fast as the downlink gain adjustments, e.g. if tilt is adjusted electronically, it may be advantageous to initially run the downlink gain at high levels while first adjusting tilt until a maximum tilting angle is reached. When load further increases while at the maximum tilt angle, downlink gain can be reduced.

For implementation, any of the control mechanisms described above might be used. The effective downlink gain G(t) would need to be transformed into tilt and power adjustment, according, e.g., to a treatment similar to that described in Example 4.

What is claimed is:

1. A method comprising:
   dynamically setting a target utilization level for one or more resources in a cell of a wireless network in which one or more transmission resources are allocated among users in the cell, and in which the cell has an access area sensitive to at least one adjustable cell parameter; and
   in response to differences between the target utilization level and actual utilization levels of the one or more transmission resources, dynamically controlling the access area so as to enlarge it when the actual utilization levels are less than the target utilization level and to contract it when the actual utilization levels are greater than the target utilization level; wherein:
   the target utilization level is set such that the dynamic control of the access area will maintain the actual utilization levels near at or above a specified maximum utilization level permitting a tolerable frequency of overload events;
   wherein the specified maximum utilization level is determined based on a time-dependent maximum theoretical calculated utilization level before permitting overload events, specified by an overload protection mechanism, but without causing a statistically intolerable frequency of overload events based on the time-dependent maximum theoretical calculated utilization level, wherein a tolerable frequency of overload events is a frequency that allows for a load balancing mechanism adjusting a physical property of one or more transmission resources to occur between cells within a selected time period; and
   the dynamic control of the access area is achieved by dynamically controlling the at least one adjustable cell parameter.

2. The method of claim 1, wherein the dynamic setting of the target utilization level is directly solely by intracell measurements.

3. The method of claim 1, wherein the one or more transmission resources belong to a group consisting of downlink transmit power, channel codes, spreading codes, access channels, packet pipes, and timeslots.

4. The method of claim 1, wherein the at least one adjustable cell parameter belongs to a group consisting of antenna tilt and transmit power of a beacon signal.

5. The method of claim 4, wherein antenna tilt and transmit power of a beacon signal are individually and sequentially adjusted.

6. The method of claim 1, wherein the dynamic setting of the target utilization level is responsive to changes in a trigger level of an overload protection mechanism.

7. The method of claim 1, wherein overloading of the one or more transmission resources can cause users in the cell to experience degraded service, the incidence of said degradation is described by a time-dependent rate B(t), and the dynamic setting of the target utilization level is performed so as to maintain an average value of B(t) at or below a specified limit.

8. The method of claim 7, wherein the degradation comprises blocking of access by users to the network, and B(t) is a time-dependent blocking rate.

9. The method of claim 1, wherein the one or more transmission resources include downlink transmit power, the utilization of downlink transmit power is described by a time-dependent variable R(t), R(t) is dynamically adjusted, a target utilization level of downlink transmit power is denominated Rtg, a variable describing a maximum utilization level of downlink power is denominated Rmax, and each of R(t), Rtg, and Rmax is defined with respect to at least one property of an aggregate downlink transmit power level.

10. The method of claim 9, wherein the at least one property is a time average.

11. The method of claim 9, wherein Rtg is a time-dependent variable denominated Rtg(t), and Rtg(t) is dynamically adjusted.

12. The method of claim 9, wherein the dynamic adjustment of R(t) is made by a proportional/integral controller.

13. The method of claim 9, wherein R(t) is time-averaged with an averaging time T1 that is at least 1 second but not more than 10 seconds.

14. A method comprising:
   dynamically setting a target utilization level for one or more resources in a cell of a wireless network in which transmission resources are allocated among users in the cell, and in which the cell has an access area sensitive to at least one adjustable cell parameter; and
   in response to differences between the target utilization level and actual utilization levels of the transmission resources, dynamically controlling the access area so as to enlarge it when the actual utilization levels are less than the target utilization level and to contract it when the actual utilization levels are greater than the target utilization level,
   wherein the target utilization level is set such that the dynamic control of the access area will maintain the actual utilization levels at or above a specified maximum utilization level without causing an intolerable frequency of overload events; and
   the dynamic control of the access area is achieved by dynamically controlling the at least one adjustable cell parameter,
   wherein the transmission resources include downlink transmit power, the utilization of downlink transmit power is described by a time-dependent variable R(t), R(t) is dynamically adjusted by a primary control loop, a target utilization level of downlink transmit power is a time-dependent variable denominated Rtg(t), Rtg(t) is dynamically adjusted by a secondary control loop, a variable describing a maximum utilization level of downlink power is denominated Rmax, and each of R(t), Rtg, and Rmax is defined with respect to at least one property of an aggregate downlink transmit power level.

15. The method of claim 14, wherein the adjustment of Rtg(t) is responsive to overswing events in which R(t) exceeds Rmax.

16. The method of claim 14, wherein the secondary control loop provides proportional/integral control.

17. The method of claim 14, wherein the secondary control loop provides integral control.

\* \* \* \* \*